Patented Nov. 18, 1924.

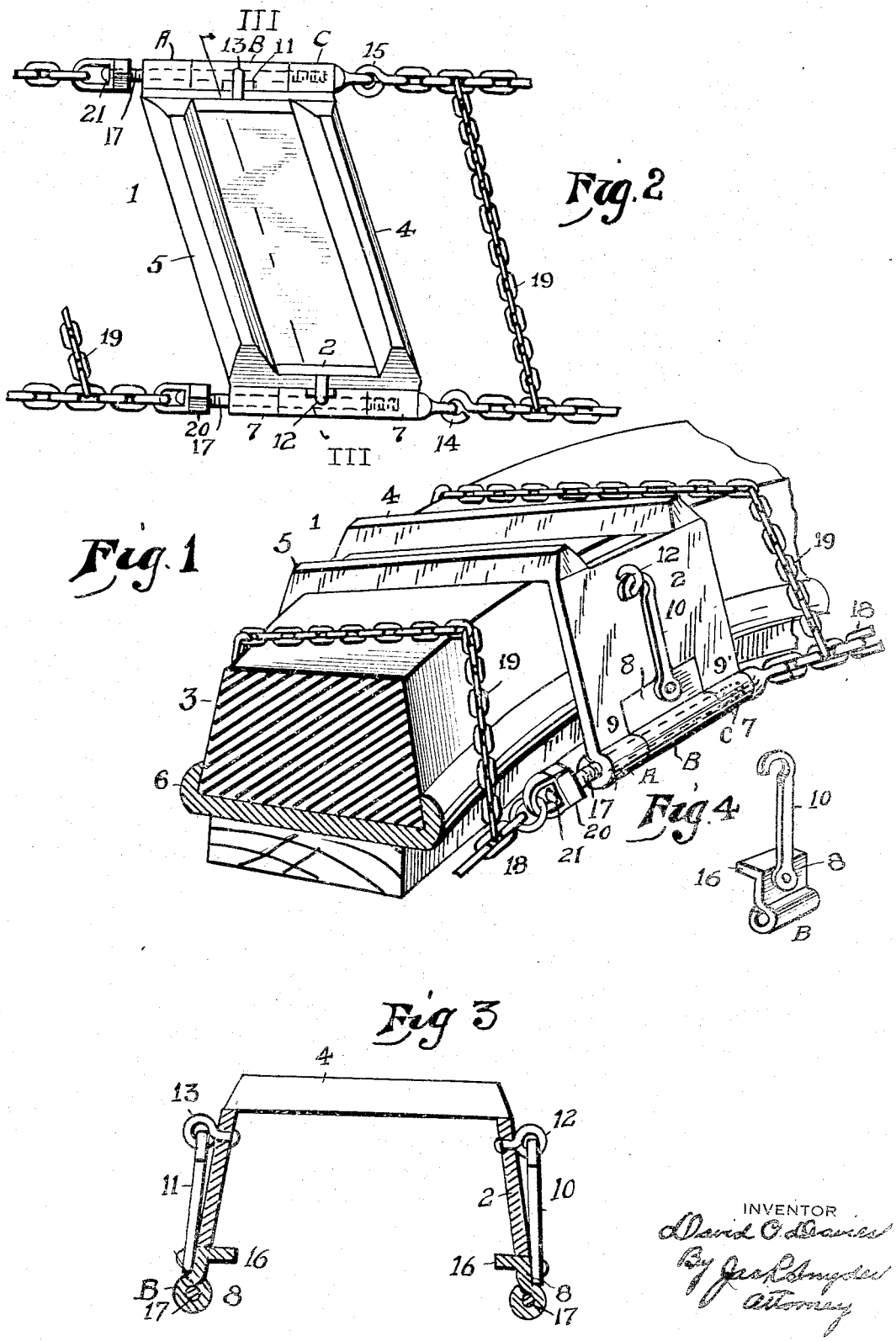

1,515,592

UNITED STATES PATENT OFFICE.

DAVID P. DAVIES, OF PITTSBURGH, PENNSYLVANIA.

TRACTION DEVICE FOR TRUCK WHEELS.

Application filed June 11, 1923. Serial No. 644,674.

*To all whom it may concern:*

Be it known that DAVID P. DAVIES, a citizen of the United States, residing at Pittsburgh, in the county of Allegheny and State of Pennsylvania, has invented certain new and useful Improvements in Traction Devices for Truck Wheels, of which the following is a specification.

This invention relates to traction devices for truck wheels.

The object of the device is to provide means for increasing the efficiency of the said wheels by increasing their traction power when driven over soft grounds or mud roads, while at the same time preventing them from sliding sideways, or skidding, on the said grounds or roads.

The invention resides in the combination and arrangement of parts, and in the details of construction described herein, and illustrated in the accompanying drawings, wherein:

Figure 1 is a view in perspective of a part of a truck wheel equipped with the coupler and its associated parts.

Figure 2 is a top plan view of the coupler and associated parts.

Figure 3 is a sectional view on line III—III, Figure 2.

Figure 4 is a perspective view of the locking plate.

The wheel for which the device is designed has its rim broader than any part of the tire resting thereon, and the said rim extends horizontally on each side of the wheel a considerable distance beyond the felly on which it is positioned. This type of wheel always has a solid tire thereon the sides of which usually slope towards the tread thereof.

Referring in detail to the drawings, the coupler 1 is composed of two metal end plates 2 extending circumferentially on the tire 3, one on each side thereof, and joined together by the cross bars 4 and 5, which extend transversely over the tire in an oblique direction, and in parallel alignment one to the other. The plates 2 and the bars 4 and 5 are so bent and proportioned as to be always, when in the engaged position, in proper contact with the surfaces on which they are designed to function, and, as will hereafter appear as the description proceeds, the said plates 2 and the said bars 4 and 5 are supplemented with other parts which give the said coupler 1 a firm hold on the tire, and make it a proper base from which to tension traction members in any position desired on the said tire.

The bars 4 and 5 serve as traction members on that part of the tire occupied by the coupler 1 and each is substantially triangular in cross section having its longitudinal side walls converging from the base to the outer edge thereof.

The end plates 2 are flatly positioned against respective sides of the tire 3 and are held in position by the bars 4 and 5 to which they are permanently attached.

The ends 9 and 9' of the plates 2, on either side of the wheel, extend over the edge of the rim 6, on which the tire rests, and are attached respectively to the tube section A and C. A locking plate 8 is positioned intermediate of the inwardly extending ends 9 and 9' on both sides of the wheel. A tube section B is carried on the inner end of each of the locking plates 8 and when the locking plate is in position the tube section B, attached thereto, forms a continuous aligned tube 7 in conjunction with the tube sections A and C respectively attached to the ends 9 and 9'.

The locking plates 8 are attached to respective plates 2 by means of arms, respectively indicated at 10 and 11. The arm 10 is permanently secured to the plate 8 and has its outer end formed to provide a hook which detachably engages the eye 12 fixed in the plate 2 on one side of the wheel. The arm 11 is similarly arranged and engages the eye 13 fixed in the plate 2 on the other side of the wheel.

The said plate 8 is of the exact dimensions to fill the space between the inner face of rim 6 and the tube section B of the tube 7, while the tube section B, which is carried by the said plate 8 exactly fits between the tube sections A and C of the said tube 7.

The rigid ends 9 and 9' of the plate 2 provide that the tube sections A and C of the tube 7, which are carried by the said ends 9 and 9', are in their engaged positions on the wheel when the coupler 1 is mounted thereon, and when the tube section B, carried by the locking plate 8 which is free to move out of its engaged position, is in alignment with the tube sections A and C, with its sides as well as its bore exactly in line with the sides and bores of the said tube sections A and C, a tensioning bolt 17 passes through all the tube sections A, B and C while in threaded engagement with the tube section A, thus making the tube 7 practically one continuous tube and holding the tube section B in its engaged position as well as its associated locking plate 8.

By coming in contact with the edge of the rim 6 on each side of the wheel, over which they pass in their several positions, the ends 9 and 9' of the plates 2 on both sides of the wheel, which support the tube sections A and C of the tube 7, enable the coupler 1 to exert a force which is rigid and unyielding on the said edges of the rim 6, which resists any tendency of traction chains attached thereto and placed in an oblique direction on the tire to abandon the obliquity of their direction on the said tire—a force which pliant chains, placed in the same position, could not exert.

Each of the locking plates 8 is formed with an angularly disposed flange 16 which seats against the inner face of the rim 6 for the purpose of preventing the coupler 1 from moving outwardly on the tire.

As the ends of the tube 7, on each side of the wheel, are held a little distance away from the side of the wheel, in this device, by the ends 9 and 9' of the plates 2, the squared part 20 of the bolt 17 has ample room between it and the side of the wheel in which to turn when in threaded engagement with the tube section A of the tube 7. The squared part 20 of the bolt 17 is adapted for engagement by a suitable tool for facilitating the adjustment of the bolt 17 in the tube 7. The circumferential chains 18, each of which has a hook at one end connecting it with one end of the tube 7, as at 14 and 15, have each of their other ends rotatably connected with the tensioning bolt 17 on the side of the wheel on which each of the said chains 18 is situated. As in an ordinary swivel, the end link of the chain 18 on each side of the wheel is provided with an aperture, so constructed and situated as to enable the rounded part of the bolt 17, adjacent to the part 20, to turn freely therein for tensioning traction members in position on the tire, in which aperture the said part of the bolt 17 is held by a knob 21 at its extreme end located within the said link.

The traction members 19 are not the only traction members the coupler 1 can hold in position on the tire, they are only the traction members selected to illustrate the device, and are chains extending transversely over the tire in an oblique direction, thereby preventing side movements of the vehicle, and they have their ends on each side of the wheel attached to the circumferential chains 18, by which, when the bolt 17 is rotated in the tube 7, on each side of the wheel, they are drawn into their engaged positions on the tire, in which positions they are held as long as the tension is continued in the said chains 18. Usually, the chains 18 are not so tensioned as to wholly prevent a circumferential movement of the traction members; to protect the engine from injury, in case a rapidly revolving wheel is suddenly stopped by some unusual obstacle the traction members would give way and would move circumferentially on the tire, thereby breaking the force of the wheel's impact with the said obstacle.

I claim:

1. A coupler for traction chains or other traction members comprising a pair of traction members substantially triangular in cross section and adapted to extend obliquely across a tire tread, an end plate fixedly connected to each end of said pair of members and disposed at respective sides of said tire, and means associated with each of said end plates for locking said coupler upon the tire and for tensioning said chains or other traction members in any position desired upon said tire.

2. A coupler for traction chains or other traction members comprising a pair of traction members substantially triangular in cross section and adapted to extend obliquely across a tire tread, an end plate fixedly connected to each end of said pair of members and disposed at respective sides of said tire, an adjustable locking plate associated with each of said end plates, and means engaging each of said end plates and associated locking plate for locking said coupler in position upon the tire and for tensioning said chains or other traction members in any position desired upon said tire.

3. A coupler for traction chains or other traction members adapted to be mounted on the tire of a wheel of the type described and comprising a pair of end plates, a pair of traction members fixedly connected to said end plates, each of said end plates formed with a pair of inwardly extending ends, a locking plate shiftably mounted intermediate to each pair of said inwardly extending ends, and means associated with each of said locking plates and respective pair of inwardly extending ends for securing said coupler in the secured position and for tensioning the traction chains or other traction members in any position desired upon said tire.

4. A coupler for traction chains or other traction members adapted to be mounted on the tire of a wheel of the type described and comprising a pair of traction members, an end plate disposed at each side of the tire and fixedly connected with said traction members, each of said end plates integrally formed with a pair of spaced inwardly extending ends, each of said ends provided with a tube section, a locking plate shiftably mounted intermediate each of said pair of ends and provided with a tube section, and means engaging said tube sections for locking said coupler upon the tire and for tensioning said chains or other traction members in any position desired upon the tire.

5. A coupler for traction chains or other traction members comprising a pair of end plates, a pair of traction members fixedly connected to said end plates and adapted to be mounted on and extend obliquely across the tread of the tire, each of said end plates formed with a pair of spaced inwardly extending ends, each of said ends provided with a tube section, a locking plate shiftably mounted intermediate each of said pair of ends and provided with a tube section, and a bolt threadably engaging one of said tube sections, and extending through the others of said tube sections for locking said coupler upon the tire and for tensioning said chains or other traction members in any position desired upon the tire.

In testimony whereof I affix my signature.

DAVID P. DAVIES.